US008855373B2

(12) United States Patent
Kamei et al.

(10) Patent No.: US 8,855,373 B2
(45) Date of Patent: Oct. 7, 2014

(54) SIMILARITY CALCULATION DEVICE, SIMILARITY CALCULATION METHOD, AND PROGRAM

(75) Inventors: Toshio Kamei, Tokyo (JP); Yoichi Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/519,307

(22) PCT Filed: Dec. 15, 2010

(86) PCT No.: PCT/JP2010/072576
§ 371 (c)(1),
(2), (4) Date: Jun. 26, 2012

(87) PCT Pub. No.: WO2011/083665
PCT Pub. Date: Jul. 14, 2011

(65) Prior Publication Data
US 2012/0294492 A1    Nov. 22, 2012

(30) Foreign Application Priority Data

Jan. 8, 2010  (JP) ................................ 2010-002569

(51) Int. Cl.
*G06K 9/00*    (2006.01)
(52) U.S. Cl.
USPC ........................................................ 382/107
(58) Field of Classification Search
None
See application file for complete search history.

(56) References Cited

U.S. PATENT DOCUMENTS

| | | | | |
|---|---|---|---|---|
| 6,621,929 | B1 * | 9/2003 | Lai et al. ........................ | 382/217 |
| 7,027,624 | B2 * | 4/2006 | Monden ......................... | 382/124 |
| 7,085,418 | B2 * | 8/2006 | Kaneko et al. ................ | 382/219 |
| 7,203,346 | B2 * | 4/2007 | Kim et al. ...................... | 382/118 |
| 7,646,891 | B2 | 1/2010 | Kage et al. | |
| 7,817,185 | B2 | 10/2010 | Kurata | |
| 8,340,370 | B2 * | 12/2012 | Monden ......................... | 382/125 |
| 8,520,981 | B2 * | 8/2013 | Akiyama ....................... | 382/305 |
| 2013/0148860 | A1 * | 6/2013 | Musatenko et al. ........... | 382/107 |

FOREIGN PATENT DOCUMENTS

| | | |
|---|---|---|
| CN | 1717923 (A) | 1/2006 |
| CN | 101090456 (A) | 12/2007 |
| JP | 2000-132691 A | 5/2000 |
| JP | 2001-092963 A | 4/2001 |

OTHER PUBLICATIONS

International Search Report in PCT/JP2010/072576 dated Jan. 18, 2011, (English Translation Thereof).

* cited by examiner

*Primary Examiner* — Nancy Bitar
(74) *Attorney, Agent, or Firm* — McGinn IP Law Group, PLLC

(57) ABSTRACT

The similarity calculation device is provided with a displacement vector estimation unit 101 for estimating a displacement vector between a first local region set in a first image, and a second local region which is most similar to the first local region in a second image, a geometric transformation parameter estimation unit 102 for estimating a geometric transformation parameter which geometrically transforms the first image into the second image, a displacement vector correction unit 103 for correcting the displacement vector based on the geometric transformation parameter, a scoring unit 104 for scoring the displacement vector, corrected by the displacement vector correction unit 103, in a two-dimensional space and creating a scored image, a peak detection unit 105 for detecting a peak in the scored image, and a similarity calculation unit 106 for calculating a similarity of the first image and the second image according to a size of the peak.

6 Claims, 5 Drawing Sheets

SIMILARITY CALCULATION DEVICE, SIMILARITY CALCULATION METHOD, AND PROGRAM

BACKGROUND

The present invention relates to a similarity calculation device, a similarity calculation method, and a program.

Conventionally, as technology for matching patterns such as images, template matching technology of images is known. This technology divides a template image into block areas, performs template matching for each of the block units, and determines the amount of displacement which can obtain the maximum matching ratio within the image to be searched regarding the respective blocks. Template matching is performed by scoring a matching ratio or the like to the coordinates of a scoring space corresponding to the amount of displacement and detecting the peak in the scoring space.

Nevertheless, when a geometric transformation occurs; for instance, when the image to be searched rotates relatively in relation to the template image, the amount of displacement which can obtain the maximum matching ratio will change pursuant to the geometric transformation. In particular, with rotational fluctuation, since the amount of displacement associated with the geometric transformation will differ based on the position, the scoring position in the scoring space will change, and the peak in the scoring space will no longer be steep, and become dull. Consequently, the matching accuracy will deteriorate.

An example of an image matching method which gives consideration to the change in the amount of displacement associated with the geometric transformation described above is disclosed in Patent Document 1.

Patent Document 1 discloses an image matching processing method comprising processing of cutting out a plurality of characteristic local regions from an input image and a model image, respectively, processing of projecting image information of the selected local region on a point set in a feature space, processing of searching, for each local region of one image, for a local region of another image that is projected on a position that is closest to the local region of the one image in the feature space, and associating the local regions, geometric transformation parameter estimation processing of estimating the geometric transformation parameter between the input image and the model image based on the positional relationship of the associated local region of one image and the local region of the other image, and processing of performing geometric transformation to the image information of the local region of one image or the image information of the overall image by using the estimated geometric transformation parameter, and evaluating and matching the consistency of the associated local regions.

[Patent Document 1] Patent Publication JP-A-2001-92963

Nevertheless, with the image matching processing method described in Patent Document 1, since geometric transformation is performed to the image information of the local region of one image or the image information of the overall image by using the estimated geometric transformation parameter, and the consistency of the associated local regions is evaluated, computation for performing geometric transformation to the image information and computation for associating the local regions of the transformed images and calculating the similarity are required, and the amount of computation will increase considerably.

SUMMARY

Thus, an exemplary object of this invention is to provide a similarity calculation device capable of inhibiting the deterioration in the matching accuracy even when geometric transformation such as rotation occurs, and reducing the amount of computation.

The similarity calculation device according to the present invention comprises a displacement vector estimation unit for estimating a displacement vector between a first local region set in a first image, and a second local region which is most similar to each of the first local regions in a second image, a geometric transformation parameter estimation unit for estimating a geometric transformation parameter which geometrically transforms the first image into the second image based on a plurality of the displacement vectors, a displacement vector correction unit for subtracting displacement caused by the geometric transformation from the displacement vector and correcting the displacement vector based on the geometric transformation parameter, a scoring unit for scoring the displacement vector, which has been corrected by the displacement vector correction unit, in a two-dimensional space defined by elements of the respective displacement vectors, a peak detection unit for detecting a peak in the two-dimensional space in which the scoring has been performed, and a similarity calculation unit for calculating a similarity of the first image and the second image according to a size of the peak.

According to an exemplary aspect of the present invention, even when the image to be matched is subject to geometric transformation such as relative rotation, since the scoring is performed after correcting the displacement vector using the estimated geometric transformation parameter and the similarity of the images is subsequently calculated, it is possible to inhibit the deterioration in the matching accuracy and reduce the amount of computation.

EXEMPLARY EMBODIMENT

The preferred exemplary embodiments for implementing the present invention are now explained with reference to the drawings.

Figure 1:
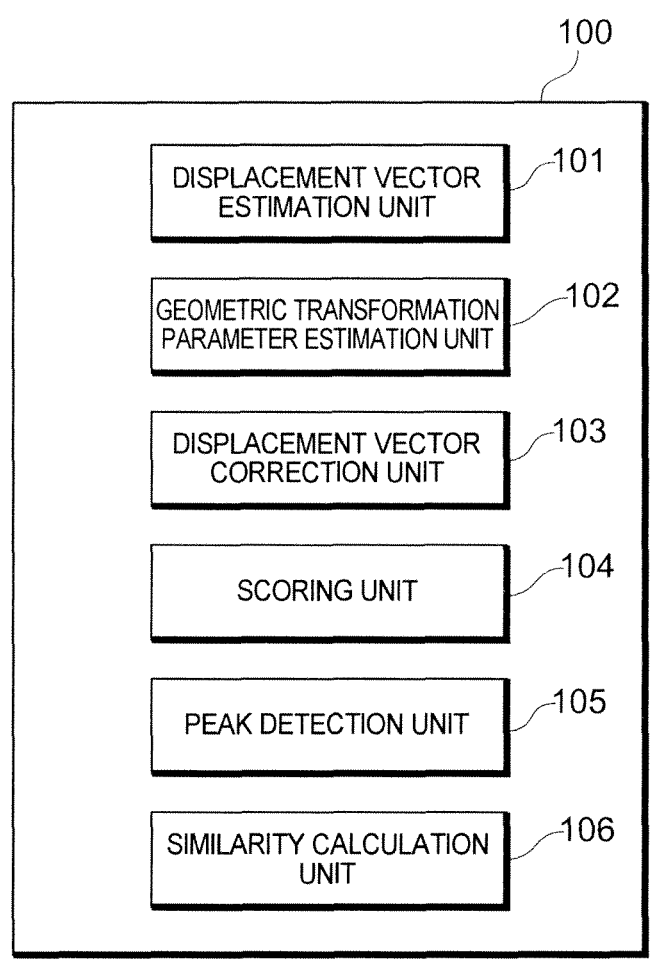
FIG. 1 is a block diagram showing the configuration of the pattern matching device according to an embodiment of the present invention.

FIG. 1 is a block diagram showing the configuration of a pattern matching device (similarity calculation device) 100 according to an embodiment of the present invention.

As shown in the diagram, the pattern matching device 100 comprises a displacement vector estimation unit 101, a geometric transformation parameter estimation unit 102, a displacement vector correction unit 103, a scoring unit 104, a peak detection unit 105, and a similarity calculation unit 106.

The displacement vector estimation unit 101, the geometric transformation parameter estimation unit 102, the displacement vector correction unit 103, the scoring unit 104, the peak detection unit 105, and the similarity calculation unit 106 are represented as modules of operations to be performed by a processor of a computer according to a program, and these units integrally configure the functions of the processor of the pattern matching device 100.

The displacement vector estimation unit 101 estimates a displacement vector (which is the amount of displacement) between a first local region set in a first image, and a second local region which is most similar to the first local region in a second image.

The geometric transformation parameter estimation unit 102 estimates a geometric transformation parameter which geometrically transforms the first image into the second image.

The displacement vector correction unit 103 corrects the displacement vector based on the geometric transformation parameter.

The scoring unit 104 scores the displacement vector, which has been corrected by the displacement vector correction unit 103, in a two-dimensional space, and creates a scored image.

The peak detection unit 105 detects a peak in the scored image.

The similarity calculation unit 106 calculates the similarity of the first image and the second image according to a size of the peak.

The operation of the pattern matching device 100 is now explained.

Figure 2:
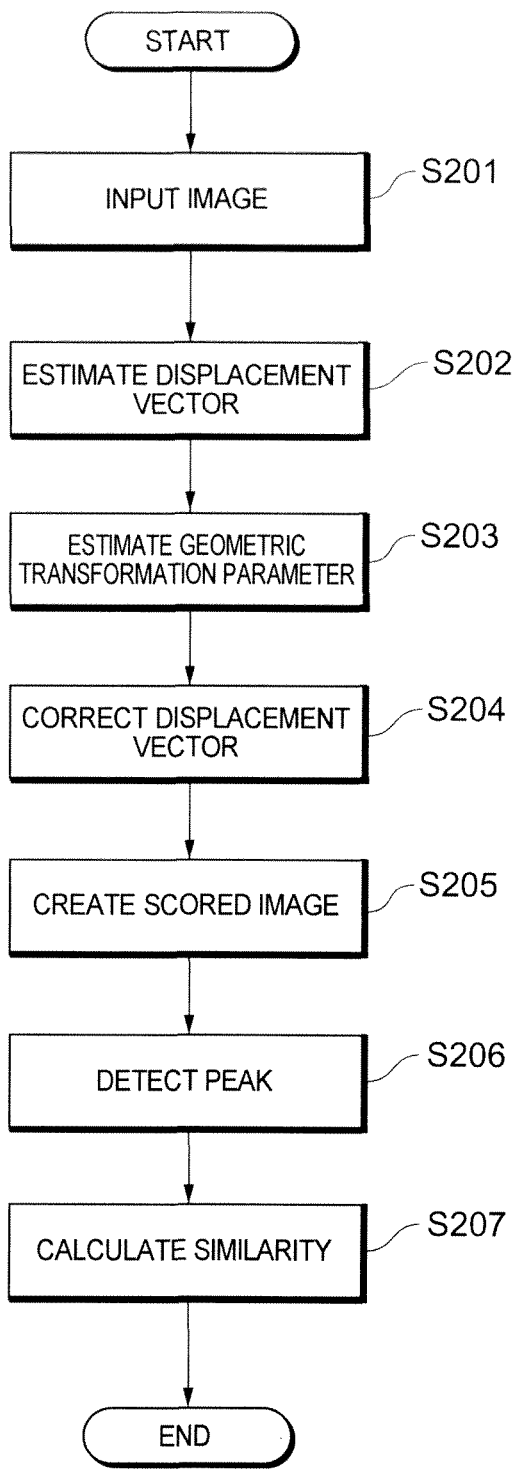
FIG. 2 is a flowchart showing the operation of the pattern matching device according to an embodiment of the present invention.

FIG. 2 is a flowchart showing an example of the operation of the pattern matching device 100 according to an embodiment of the present invention. Here, the matching of facial images is taken as an example and explained.

Foremost, two images to be subject to image matching are input to the pattern matching device 100 (step S201). Input of the images can be performed via a scanner or the like. Note that, in the ensuing explanation, one image (first image) of the two images to be subject to the image matching is indicated as f(x, y), and the other image (second image) is indicated as g(x, y), and the image size of the respective images shall be 256× 256 pixels.

The size and direction of the first image f(x, y) and the second image g(x, y) are basically normalized by associating both images in advance via detection of the eye position or the like. Conventional technology may be used for this kind of normalization processing. However, normally, there are detection errors in the eye position to be detected, and there are cases where geometric variation such as rotation between the two images occurs.

Next, the displacement vector estimation unit 101 obtains the local region of the second image g(x, y) which is most similar to the first image f(x, y) via the block matching method or the like regarding a plurality of local regions including a plurality of reference points (s, t) set in the input first image f(x, y), and calculates the displacement vector v(s, t) as the amount of displacement between the similar local regions of both images (step S202).

Specifically, foremost, a correlation value R(s, t, p, q) of the local region centered around the reference points (s, t) of the image f(x, y) and the local region centered around the reference points (s+p, t+q) of the image g(x, y) is calculated based on Formula (1). The size of each local region is set so that the x direction is $2N_u+1$ and the y direction is $2N_v+1$ and, for instance, set to $N_u=N_v=8$ pixels. Moreover, the reference points (s, t) are set, for example, for every 8×8 pixels, and 32×32 reference points are set in the first image.

[Equation 1]

$$R(s, t, p, q) = \sum_{u=-N_u}^{N_u} \sum_{v=-N_v}^{N_v} f(s+u, t+v)g(s+p+u, t+q+v) \quad (1)$$

Subsequently, the amount of displacement $(p_{max}, q_{max})$ in which the correlation value R becomes maximum is obtained as the displacement vector v(s, t) relative to the reference points (s, t) based on Formula (2).

Here, $\max^{-1} R$ represents the p, q in which the R becomes a maximum value.

[Equation 2]

$$v(s, t) = \begin{pmatrix} p_{max}(s, t) \\ q_{max}(s, t) \end{pmatrix} = \max_{(p,q)}^{-1} R(s, t, p, q) \quad (2)$$

Note that the correlation value which becomes maximum at the reference points (s, t) is represented as $R_{max}(s, t)$.

Next, the geometric transformation parameter estimation unit 102 uses the displacement vector v(s, t) obtained in step S202 and estimates the geometric transformation parameter between the image f(x, y) and the image g(x, y) (step S203). Assuming that there is geometric transformation subject to affine transformation constraint between the image f(x, y) and the image g(x, y), the relationship of the reference points (s, t) of the image f(x, y) and the reference points (s', t') of the image g(x, y) is represented by Formula (3).

[Equation 3]

$$\begin{pmatrix} s' \\ t' \end{pmatrix} = \begin{pmatrix} a_{11} & a_{12} \\ a_{21} & a_{22} \end{pmatrix} \begin{pmatrix} s \\ t \end{pmatrix} + \begin{pmatrix} b_1 \\ b_2 \end{pmatrix} \quad (3)$$

$$= A \begin{pmatrix} s \\ t \end{pmatrix} + b$$

Here, A, b are parameters of the affine transformation. Subsequently, the displacement vector v(s, t) of the respective reference points (s, t) obtained by the displacement vector estimation unit 101 is used to estimate A, b by using, for example, the least-square method. Specifically. A, b which minimize J represented in Formula (4) are obtained.

[Equation 4]

$$J = \sum_{(s,t)} \left| v(s, t) - \left( A \begin{pmatrix} s \\ t \end{pmatrix} + b - \begin{pmatrix} s \\ t \end{pmatrix} \right) \right|^2 \quad (4)$$

Note that, while the affine transformation having six degrees of freedom was used for estimating the geometric transformation parameters A, b in this example, the estimation may also be performed by using the three parameters of translation and rotation, or the four parameters of translation and rotation and expansion and contraction.

Next, the displacement vector correction unit 103 uses the geometric transformation parameters A, b obtained in step S203 to correct the displacement vector v(s, t) based on Formula (5), and calculates the corrected displacement vector V(s, t) (step S204).

[Equation 5]

$$v'(s, t) = v(s, t) - \left( A \begin{pmatrix} s \\ t \end{pmatrix} + b - \begin{pmatrix} s \\ t \end{pmatrix} \right) \quad (5)$$

Subsequently, the scoring unit 104 uses the corrected displacement vector v'(s, t) obtained in step S204 and scores the displacement vector v'(s, t) in a two-dimensional scoring space H corresponding to the v'(s, t) (step S205).

The scoring space H is represented as alignment ([p'], [q']) when v'(s, t)=(p', q'). Here[x] is a value obtained by discretizing x. As shown in Formulas (6) and (7), the scoring unit 104 adds 1 or the maximum correlation value $R_{max}$(s, t) obtained upon calculating the displacement vector to the scoring space H.

[Equation 6]

$$H([p'],[q'])+=1 \quad (6)$$

[Equation 7]

$$H([p'],[q'])+=R_{max}(s,t) \quad (7)$$

Next, the peak detection unit 105 detects the peak showing the maximum value in the scoring space H (step S206). Note that, in order to detect the peak, smoothing processing or the like may be performed to the scoring space H obtained with the scoring unit 104. As a result of performing smoothing as described above, it is possible to ensure tenacity against noise. As the smoothing processing, for example, Gaussian convulsion operation or the like may be performed to the scoring space H, which is a two-dimensional array.

Subsequently, the similarity calculation unit 106 obtains the maximum peak value in the scoring space H and calculates the similarity of the first image and the second image according to the size of the peak (step S207). Here, if smoothing processing or the like is not performed to the scoring space H, weighting processing such as the Gauss window may be performed to the vicinity of the peak so as to obtain the sum of the values of the scoring space H in the vicinity of the peak.

The similarity of the first image and the second image is calculated based on the foregoing processing.

Figure 3:
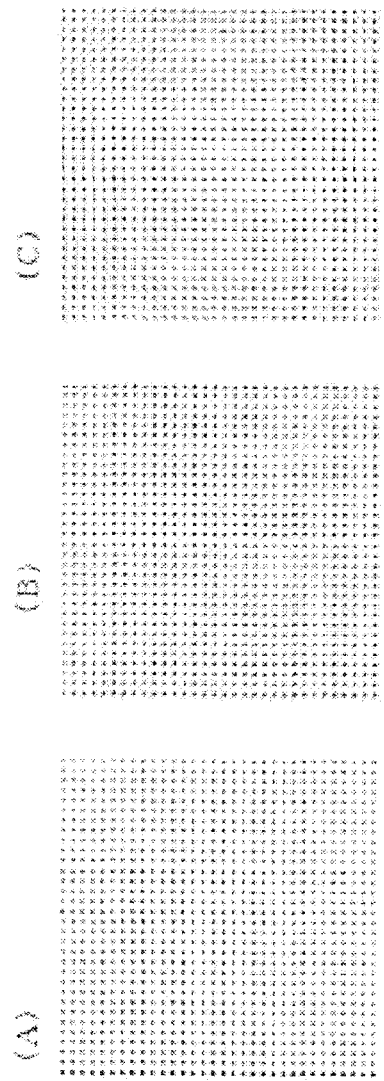
FIGS. 3(A) to 3(C) are diagrams schematically illustrating an example of the displacement vectors that are estimated at the respective reference points of the image.

FIG. 3 is a diagram schematically illustrating an example of the displacement vectors between the two images that are estimated at the respective reference points. FIG. 3(A) shows an example of the displacement vector that is estimated when the matching is performed ideally without any displacement or rotation between the two images. FIG. 3(B) is an example of the displacement vector that is estimated when there is translational displacement between the two images. FIG. 3(C) is an example of the displacement vector that is estimated when rotational fluctuation occurs.

Figure 4:
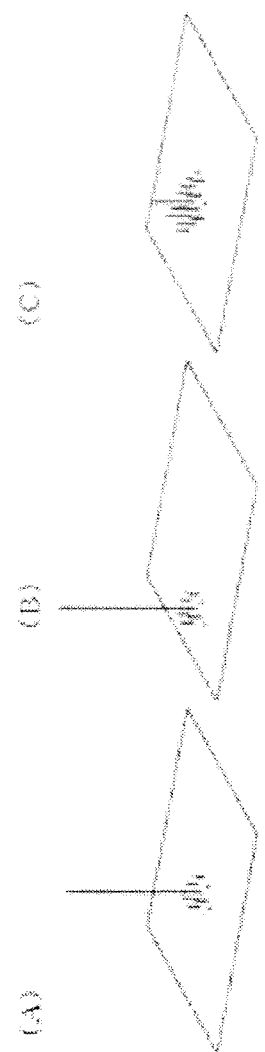
FIGS. 4(A) to 4(C) are diagrams schematically illustrating the scoring values obtained by performing score processing to the respective displacement vectors of FIGS. 3(A) to 3(C) in the scoring space.

FIGS. 4(A) to 4(C) are diagrams schematically illustrating the scoring values obtained by performing score processing to the respective displacement vectors of FIGS. 3(A) to 3(C) in the scoring space.

As shown in the diagrams, with FIG. 4(A), since there is no displacement or rotation between the two images, the displacement vector is distributed near the coordinates (0, 0) of the scoring space, and a steep peak is detected in the scoring space. With FIG. 4(B), while there is translational displacement between the two images, since the displacement vector is distributed near the coordinate values that shifted according to the translation, a steep peak is detected.

Meanwhile, with FIG. 4(C), there is rotational fluctuation between the two images, and fluctuation of displacement associated with the geometric transformation of the rotation is added to the respective displacement vectors, and the distribution of the displacement vectors is not constant. Thus, the peak value that is detected in the scoring space becomes small, and the peak becomes dull. Moreover, even in cases where the scale fluctuation (expansion/contraction) of the image occurs, since the variation will change according to the position of the image as with rotational fluctuation, the peak becomes dull and the peak value becomes small.

According to this embodiment, by correcting the displacement vector v(s, t) by using the geometric transformation parameters A, b, the variation associated with the geometric transformation is corrected, and the displacement vector v'(s, t) having a distribution near the coordinate values (0, 0) of the original can be obtained.

Figure 5:
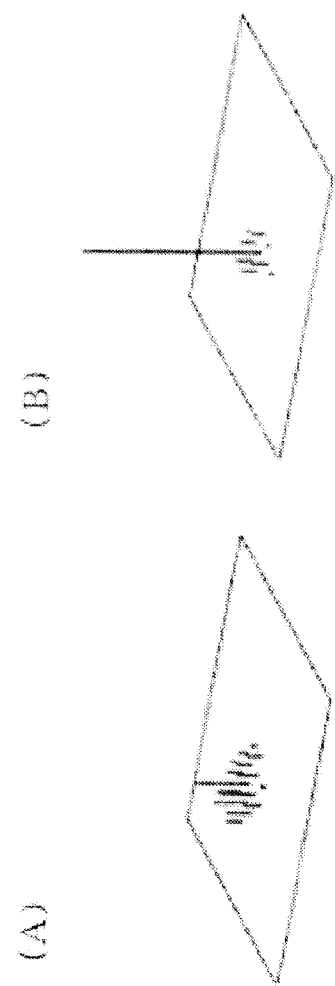
FIG. 5 is a diagram explaining the fluctuation of the peak that is detected in the scoring space based on the application of the present invention.

For example, as shown in FIG. 5(A), even in cases where the peak obtained upon performing the score processing is dull due to the rotational fluctuation of the image, by using the geometric transformation parameter and correcting the displacement vector, a steep and large peak is detected as shown in FIG. 5(B). Thus, according to this embodiment, the dullness of the peak in the scoring space associated with the geometric transformation is eliminated, and the accuracy of the similarity determination of the two images can be improved.

Moreover, according to this embodiment, since the displacement vector between the two images is corrected by using the geometric transformation parameter, the score processing can be directly performed by using the displacement vector that was subject to the geometric transformation. Thus, in comparison to the case of performing geometric transformation to the image information itself, there is no need to perform geometric transformation processing of the image, and no need to associate the local regions once again with respect to the geometrically transformed image, it is possible to considerably reduce the amount of computation.

Note that, in this embodiment, while a case of matching of facial images was explained, the present invention can also be applied to the matching of other biological patterns such as fingerprint images or venous images. In addition, the present invention can also be applied to image matching of various fields in addition to the matching of biological patterns.

This application relates to and claims priority from Japanese Patent Application No. 2010-002569, filed on Jan. 8, 2010, the entire disclosure of which is incorporated herein by reference.

The present invention was explained above with reference to the embodiments, but the present invention is not limited to the foregoing embodiments. The configuration and details of the present invention can be variously modified by those skilled in the art within the scope of the present invention.

The present invention can be suitably used for inhibiting the deterioration in the matching accuracy even when geometric transformation such as rotation occurs, and reducing the amount of computation.

100 pattern matching device, 101 displacement vector estimation unit, 102 geometric transformation parameter estimation unit, 103 displacement vector correction unit, 104 scoring unit, 105 peak detection unit, 106 similarity calculation unit

We claim:
1. A similarity calculation device, comprising:
   a displacement vector estimation unit for estimating a displacement vector between a plurality of first local regions set in a first image, and a second local region which is most similar to each of the first local regions in a second image;

a geometric transformation parameter estimation unit for estimating a geometric transformation parameter which geometrically transforms the first image into the second image based on a plurality of the displacement vectors;

a displacement vector correction unit for subtracting displacement caused by the geometric transformation from the displacement vector and correcting the displacement vector based on the geometric transformation parameter;

a scoring unit for scoring the displacement vector, which has been corrected by the displacement vector correction unit, in a two-dimensional space defined by elements of the respective displacement vectors;

a peak detection unit for detecting a peak in the two-dimensional space in which the scoring has been performed; and a similarity calculation unit for calculating a similarity of the first image and the second image according to a size of the peak.

2. The similarity calculation device according to claim 1, wherein the geometric transformation parameter comprises a parameter of affine transformation.

3. The similarity calculation device according to claim 1, wherein the scoring unit performs smoothing processing on the two-dimensional space in which the scoring has been performed.

4. A similarity calculation method, comprising:

estimating a displacement vector between a plurality of first local regions set in a first image, and a second local region which is most similar to each of the first local regions in a second image;

estimating a geometric transformation parameter which geometrically transforms the first image into the second image based on a plurality of the displacement vectors;

subtracting displacement caused by the geometric transformation from the displacement vector and correcting the displacement vector based on the geometric transformation parameter;

scoring the corrected displacement vector in a two-dimensional space defined by elements of the respective displacement vectors;

detecting a peak in the two-dimensional space in which the scoring has been performed; and calculating a similarity of the first image and the second image according to a size of the peak.

5. A non-transitory computer-readable medium tangibly embodying a program for causing a computer to function as:

a displacement vector estimation unit for estimating a displacement vector between a plurality of first local regions set in a first image, and a second local region which is most similar to each of the first local regions in a second image;

a geometric transformation parameter estimation unit for estimating a geometric transformation parameter which geometrically transforms the first image into the second image based on a plurality of the displacement vectors;

a displacement vector correction unit for subtracting displacement caused by the geometric transformation from the displacement vector and correcting the displacement vector based on the geometric transformation parameter;

a scoring unit for scoring the displacement vector, which has been corrected by the displacement vector correction unit, in a two-dimensional space defined by elements of the respective displacement vectors;

a peak detection unit for detecting a peak in the two-dimensional space in which the scoring has been performed; and a similarity calculation unit for calculating a similarity of the first image and the second image according to a size of the peak.

6. The similarity calculation device according to claim 2, wherein the scoring unit performs smoothing processing on the two-dimensional space in which the scoring has been performed.

\* \* \* \* \*